United States Patent [19]

Laing

[11] 3,990,636
[45] Nov. 9, 1976

[54] MOTOR CAR HEATER

[76] Inventor: Nikolaus Laing, Hofener Weg 35 bis 37, 7141 Aldingen near Stuttgart, Germany

[22] Filed: Sept. 6, 1974

[21] Appl. No.: 503,737

Related U.S. Application Data

[63] Continuation of Ser. No. 293,142, Sept. 28, 1972, abandoned.

[30] Foreign Application Priority Data

Oct. 7, 1971 Austria ................. 8656/71

[52] U.S. Cl. .............. 237/12.3 B; 165/86; 165/92; 165/51
[51] Int. Cl.² .................................... B60H 1/06
[58] Field of Search ........... 237/12.3 B, 5, 12.7, 237/8 A; 165/86, 92, 51

[56] References Cited
UNITED STATES PATENTS

| | | |
|---|---|---|
| 1,584,002 | 5/1926 | Aeby et al. ................. 237/12.3 B |
| 2,672,293 | 3/1954 | Ludlow ...................... 237/12.3 B |
| 2,749,049 | 6/1956 | Smith ............................ 237/8 A |
| 2,800,068 | 7/1957 | Arnold et al. .............. 237/12.3 B |
| 3,347,059 | 10/1967 | Laing ............................... 165/86 |
| 3,424,234 | 1/1969 | Laing ............................... 165/89 |
| 3,477,499 | 11/1969 | Goetz .............................. 165/86 |
| 3,696,634 | 10/1972 | Ludin et al. ................. 165/86 X |
| 3,773,106 | 11/1973 | Levy ............................... 165/86 |

FOREIGN PATENTS OR APPLICATIONS 1,154,777  6/1969  United Kingdom ........... 237/12.3 B

*Primary Examiner*—Albert W. Davis, Jr.
*Assistant Examiner*—Sheldon Richter
*Attorney, Agent, or Firm*—Pennie & Edmonds

[57] ABSTRACT

A motor car heater comprising a rotating heat exchanger which acts as the air blowing element and where the heat exchanger has a large number of annular fins which are traversed by axially running pipes and with supply and discharge channels in a hollow face wall of the exchanger.

1 Claim, 5 Drawing Figures

MOTOR CAR HEATER

This is a continuation of application Ser. No. 293,142, filed Sept. 28, 1972, now abandoned.

THE PRIOR ART

A motor car heater usually serves for the heating of the interior of the vehicle and also for the supply of warm air for defrosting or demisting the windscreen and finally for conveying cold air to ventilate the vehicle. Motor car heaters are operated by using electrically driven high-speed blowers in association with heat exchangers. They are usually arranged near the fireproof bulkhead between the engine space and the interior, where a number of other appliances are usually installed and where, owing to the limited space available in this region of the vehicle, their installation presents a design problem. Such blowers are usually driven by high-speed electric motors because low-speed motors are heavy and, furthermore, low-speed blowers do not generate a sufficient pressure to produce a sufficiently large discharge velocity of air underneath the windscreen and to overcome the pipe friction in the narrow channels. The blowers, therefore, always generate noise, which may be at a higher noise level in the interior of the automobile than that of the vehicle engine.

THE OBJECT OF THE INVENTION

The invention has the aim of providing a motor car heater which is superior to all known motor car heaters in terms of its physical size and in terms of noise qualities.

DESCRIPTION OF THE INVENTION

The invention utilises a rotating heat exchanger which simultaneously generates the airflow through shear stresses imparted to the air. Flow of water from a cooling water circulation of the vehicle engine, which traverses the heat exchanger, may be controlled by a valve to the point of complete throttling so that the heating of the air can be selected as desired. When throttling is complete and the water throughput is interrupted, the rotating heat exchanger then operates exclusively as a fan. The driving motor is so arranged in the region of air suction that it is cooled by the incoming cold air.

The invention will be described, by way of example, with the help of the accompanying drawings in which.

Figure 1:
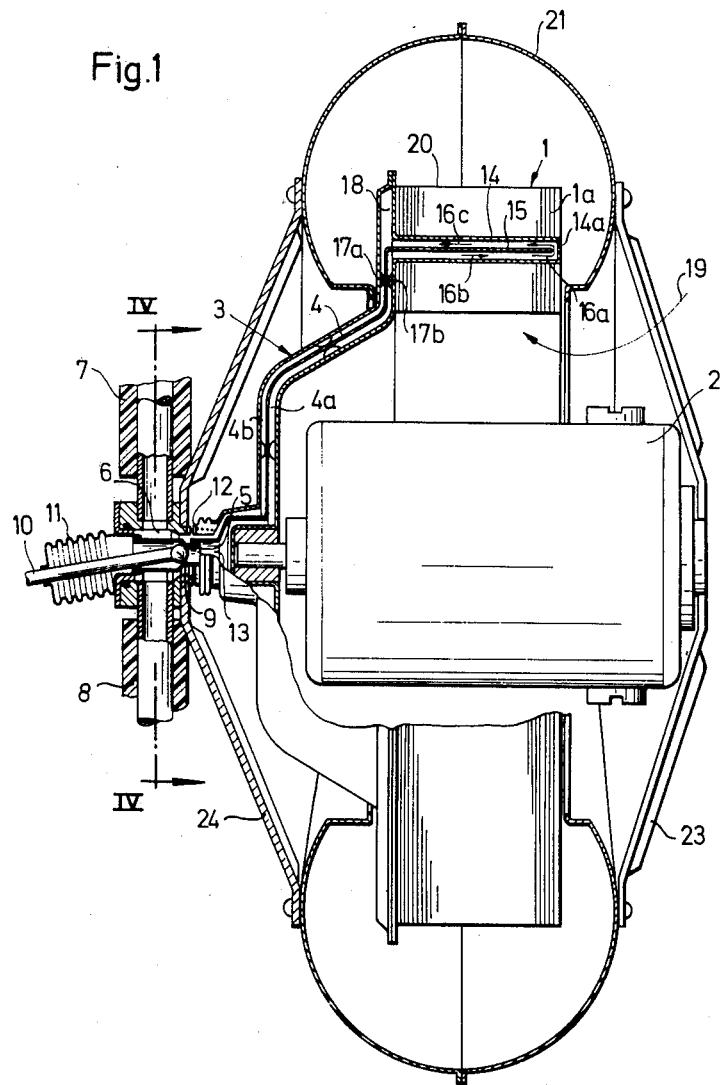
FIG. 1 shows a cross-section through a rotating heat exchanger.
Figure 4:
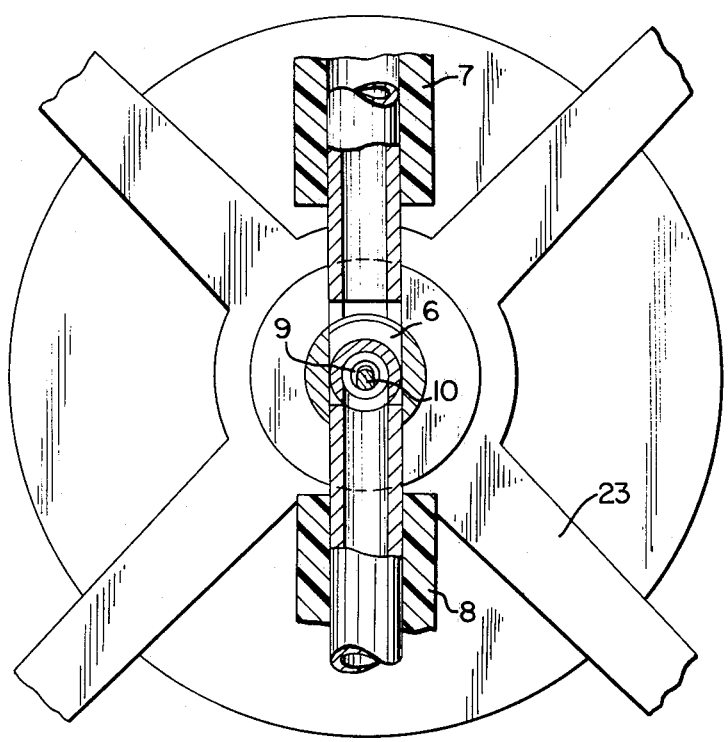
FIG. 4 is an enlarged cross-section of FIG. 1 taken along the lines IV-V of FIG. 1.

Referring to FIG. 1 and FIG. 4, there is illustrated a rotatable heat exchanger 1 having a large number of annular flat rings 1a of thin aluminium sheet. The exchanger is driven by the motor 2 via a saucer-shaped wheel 3. A separating wall 4 is situated in the thickness of the hollow wheel and divides the interior of the thickness of the wheel into an inner and an outer hollow space 4a and 4b, respectively, which serve as inflow and outflow ducting means. The space 4a communicates with the inlet duct 5 for hot water, whilst the outer hollow space 4b communicates with the annular space 6 and thereby to the water discharging hose 7.

Water enters through the hose 8. A controllable valve ball 9 which is actuated by a control rod 10, controls the mass flow of the water entering space 4a. Bellows 11 provides hermetic sealing of the control rod 10. A liquid shaft seal 12 which is connected to the saucer-shaped wheel on the side of the wheel opposite the drive shaft prevents escape of water from the water circuit. The separating wall 4 blends into a socket 13, the inside diameter of which is slightly larger than the outside diameter of the inlet duct 5. Hot water flows through the space 4a to the pipes 14 and is then guided as shown by the arrows 16a, 16b and 16c through the annular passages defined by the cylindrical separating walls 15, the axial length of which approximates to the length of the pipes but not quite reaching their ends at 14a. The water then enters the collector space 18 which communicates with the outer hollow space 4b and the outlet hose 7. The separating wall 4 is held spaced from the two walls of the hollow wheel 3 by extruberances such as 17a and 17b. When the valve ball 9 is closed, water is prevented from entering the inside of the rotating heat exchanger 1 and the device acts as a blower for circulating ambient air through the interior of a motor car.

The heat exchanger draws in air along the path indicated by the arrow 19, which flows from the periphery 20 into the 180° volute housing having ducts 21 whence the air is discharged from outlets 22. Such air is, therefore, either heated by the water or remains unheated and relatively cool. The stator part of the motor 2 is attached by the spokes 23 to the structure of the volutes 21, whilst the spokes or the plate 24 provide the centering of the ducting and valve elements.

Figure 2:
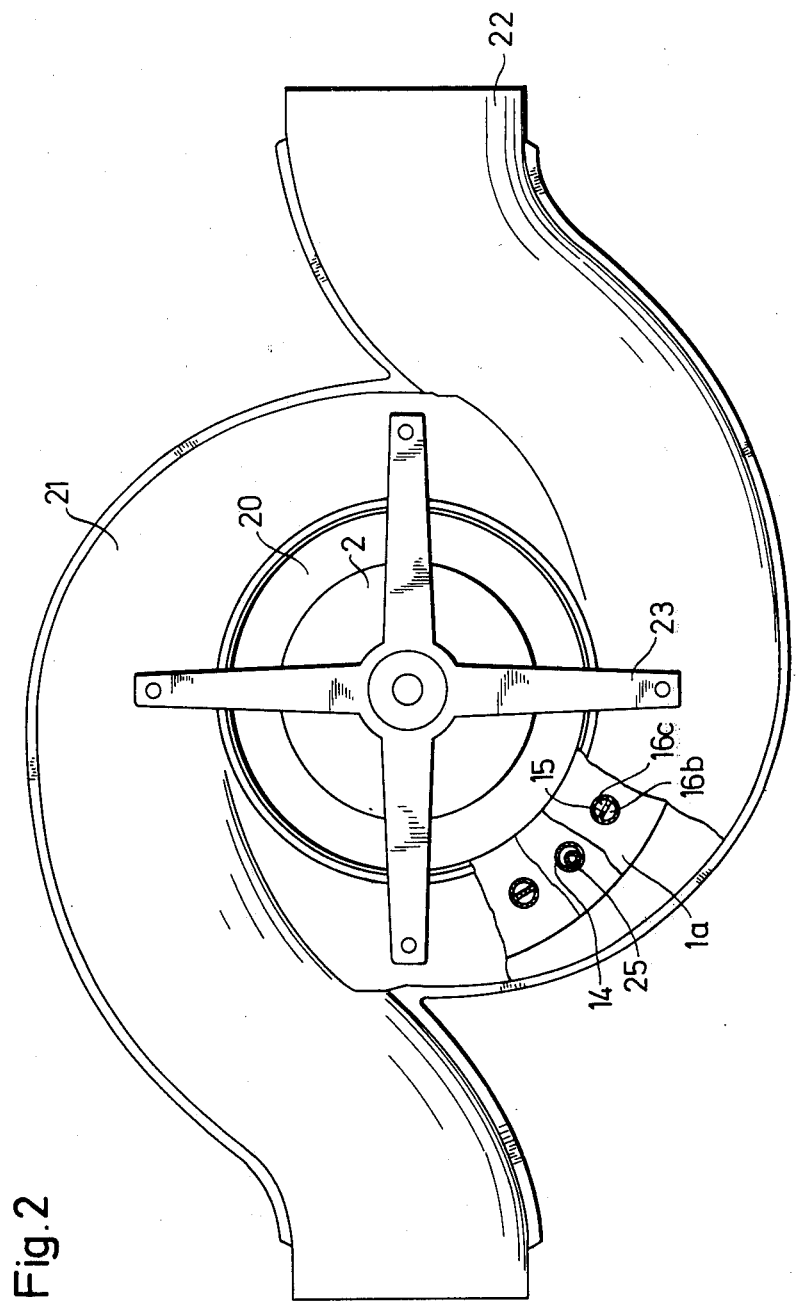
FIG. 2 shows an elevation viewed along the axis of the illustration of FIG. 1, however, to a smaller scale.

FIG. 2 shows a view of the motor side, partly cut away. The separating walls 15 are shown dividing the pipes 14 in the illustrated manner into the in and out flow channels shown by the arrows 16b and 16c. Instead of the wall 15, the axial flows in the pipes 14 may be conducted by pipes 25 within the pipes 14 also as illustrated in FIG. 2 which illustrates both schemes. The pipes 25 in such variant communicate with one of the spaces 4a or 4b and, like the separating walls 15, the pipes 25 do not quite reach the closed ends at 14a of the pipes 14.

Figure 3:
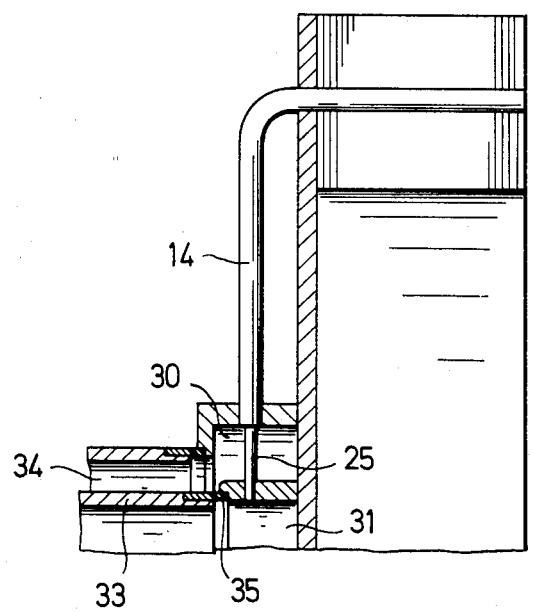
FIG. 3 illustrates a variant of the heat exchanger of FIG. 1.
Figure 1A:
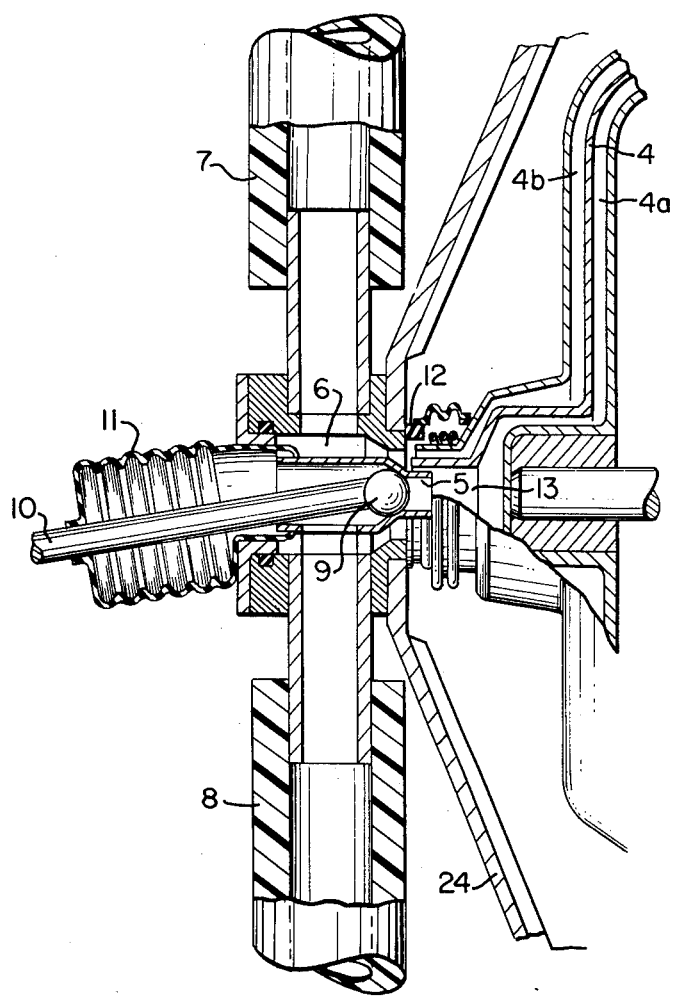
FIG. 1a is an enlarged portion of FIG. 1.

At very high rotational speeds, substantial hydrostatic pressure is generated in the space 18 which pressure may be accomodated by the use of the pipes 25 which can extend inwardly to the hub along with the pipes 14. FIG. 3 shows such an embodiment in which all the pipes 14 reach a collector space 30, whilst all the pipes 25 reach a coaxial collector space 31. It is advantageous if the diameter ratio of the pipes is chosen to be 1 : 1.5, whereby the velocity inside both channels is approximately the same. The pressure inflow is applied within the inside pipe 33, whilst the return flow proceeds through the annular space 34. A seal 35 is necessary only when the design pressure difference is very high.

I claim:

1. A motor car heater and an air blower construction having a rotary heat exchanger with said heat exchanger comprising a plurality of axially spaced annular flat heat exchanger rings having an open center space forming an air inlet, a plurality of axially extending liquid flow pipes connecting said rings and forming liquid inflow and outflow channels, and a saucer-shaped wheel having liquid inflow and outlet ducting means therein connecting with said liquid inflow and outflow channels; a volute housing surrounding said rotary heat exchanger and having at least one air inlet; a drive motor having a drive shaft positioned in said air inlet with an end of said shaft connected to an supporting one axial side of said saucer-shaped wheel; liquid seal means connected to said saucer-shaped wheel on the side opposite the motor shaft, said liquid seal means communicating with said outlet ducting means and being connectable with the inlet side of a liquid cooling system of a motor car engine; liquid connecting means associated with the inflow ducting means of the saucer-shaped wheel connectable with the outlet side of a liquid cooling system of a motor car engine; and valve means in said inflow and outflow ducting means movable between open and closed positions to regulate flow of fluid through said rotary heat exchanger whereby heat may be controllably transferred to air being drawn through the air inlet by the sheer forces exerted on the air by the axially spaced rings when said heat exchanger is rotated.

* * * * *

UNITED STATES PATENT AND TRADEMARK OFFICE
CERTIFICATE OF CORRECTION

PATENT NO. : 3,990,636
DATED : November 9, 1976
INVENTOR(S) : NIKOLAUS LAING

It is certified that error appears in the above-identified patent and that said Letters Patent are hereby corrected as shown below:

In Claim 1 at Col. 3, line 6, "an" second occurrence should be --and--;

Signed and Sealed this

Eleventh Day of January 1977

[SEAL]

Attest:

RUTH C. MASON
Attesting Officer

C. MARSHALL DANN
Commissioner of Patents and Trademarks